United States Patent [19]

Costa et al.

[11] Patent Number: 5,206,198

[45] Date of Patent: Apr. 27, 1993

[54] CATALYTIC SOLID USABLE FOR THE STEREOSPECIFIC POLYMERIZATION OF ALPHA-OLEFINS, PROCESS FOR PREPARING IT AND PROCESS FOR POLYMERIZING ALPHA-OLEFINS IN ITS PRESENCE

[75] Inventors: Jean-Louis Costa, Grimbergen; Sabine Pamart, Mons, both of Belgium

[73] Assignee: Solvay S.A., Brussels, Belgium

[21] Appl. No.: 786,043

[22] Filed: Oct. 31, 1991

[30] Foreign Application Priority Data

Nov. 8, 1990 [BE] Belgium ............................. 09001054

[51] Int. Cl.$^5$ ........................................... C08F 4/642
[52] U.S. Cl. ................................. 502/107; 502/108; 502/112; 502/113; 502/119; 502/120; 502/121; 502/122; 502/123; 502/124; 502/125; 502/126; 502/127; 526/129
[58] Field of Search ............... 502/107, 108, 119, 120, 502/126, 113, 112, 121, 122, 123, 124, 125, 127

[56] References Cited

U.S. PATENT DOCUMENTS

| 4,115,533 | 9/1978 | Yamaguchi et al. | 526/159 X |
|---|---|---|---|
| 4,210,729 | 7/1980 | Hermans et al. | 502/126 X |
| 4,210,738 | 7/1980 | Hermans et al. | 502/126 X |

FOREIGN PATENT DOCUMENTS

| 780758 | 10/1971 | Belgium . |
|---|---|---|
| 0202946 | 11/1986 | European Pat. Off. . |
| 0238345 | 9/1987 | European Pat. Off. . |
| 0261727 | 3/1988 | European Pat. Off. . |
| 60-071609 | 4/1983 | Japan . |
| 65954 | 8/1972 | Luxembourg . |
| 1557329 | 12/1979 | United Kingdom . |

OTHER PUBLICATIONS

Kirk–Othmer Encyclopedia of Chemical Technology, 2nd edition, vol. 8, 1965, p. 94.
Macromolecules, vol. 6, No. 6, pp. 925–926.
Rubber Chemistry and Technology, vol. 44, p. 781, (1971).

Primary Examiner—Patrick P. Garvin
Attorney, Agent, or Firm—Spencer, Frank & Schneider

[57] ABSTRACT

Catalytic solids based on titanium trichloride complex, usable for the stereospecific polymerization of alpha-olefins, obtained by heat treatment, in the presence of a halogenated activating agent, of the liquid material resulting from bringing $TiCl_4$, pretreated with an electron-donor compound, into contact with a composition (C) corresponding to the general formula $$AlR_p(Y)_q X_{3-(p+q)}$$

in which
R represents a hydrocarbon radical or a hydrogen atom;
Y represents a group chosen from —OR', —SR' and —NR'R'', in which R' and R'' each represent a hydrocarbon radical or a hydrogen atom;
X represents a halogen;
p is an arbitrary number such that $0<p<3$; and
q is an arbitrary number such that $0<q<3$; the sum (p+q) being such that $0<(p+q)\leq 3$.

These catalytic solids of controllable porosity permit the production of a wide range of propylene polymers, in particular the propylene and ethylene copolymers known as "block" copolymers.

18 Claims, No Drawings

CATALYTIC SOLID USABLE FOR THE STEREOSPECIFIC POLYMERIZATION OF ALPHA-OLEFINS, PROCESS FOR PREPARING IT AND PROCESS FOR POLYMERIZING ALPHA-OLEFINS IN ITS PRESENCE

The present invention relates to a catalytic solid usable for the stereospecific polymerisation of alpha-olefins, a process for preparing this solid and a process for the polymerisation of alpha-olefins in the presence of this solid.

It is known to polymerise alpha-olefins, such as propylene, stereospecifically using a catalytic system comprising a solid constituent based on titanium trichloride and an activator comprising an organometallic compound such as an alkylaluminium chloride.

In the patent BE-A-780758 (SOLVAY & Cie) particles of titanium trichloride complex have been described, the use of which in the polymerisation of alpha-olefins is particularly advantageous. These particles are characterised by their particular structure. In fact, they consist of an agglomerate of microparticles which are themselves extremely porous. The consequence of this is that these particles have a particularly high specific surface area and porosity.

This particular structure leads, on polymerisation, to exceptional performance. Because of the porosity of the microparticles developed essentially in the pores having radii of less than 200 Å, the catalytic activity is so high that it is possible to carry out the polymerisation under conditions such that the catalytic residues no longer have to be removed. Moreover, given that these particles are in the shape of regular large spheres, the polymer obtained is likewise in the form of regular spherical particles. The consequence of this is that it has a high apparent specific weight and that it has a very good pourability.

However, these particles are not suitable for the production of high impact-strength block copolymers (known as "high impact grades") obtained by incorporating, in a propylene homopolymer prepared in a first step, significant amounts of a propylene/ethylene elastomer prepared in a second step. In fact, the high density and the porosity, essentially confined in the very small pores, of these particles of titanium trichloride complex lead to a homopolymer, the low porosity of which, in its turn, does not permit the incorporation therein of large amounts of elastomer, thus giving rise to caking problems which are the more acute the larger the amount of elastomer to be incorporated. These problems are particularly disagreeable in the polymerisation processes carried out using the most recent techniques, that is to say in the monomer kept in the liquid state or in gas phase.

An attempt has been made to overcome these problems by producing these copolymers in the presence of solid catalytic constituents characterised by a porosity of not less than 0.08 cm³/g in the zone of pore radii of between 200 and 15000 Å (Patent Application EP-A-0202946 (SUMITOMO CHEMICAL)). The preparations of the catalytic constituents described in this application and having this characteristic are, however, complex and the operating method chosen predetermines the porosity obtained.

It has now been found that catalytic solids which are of controllable porosity and therefore are capable of being used to prepare a wide range of alpha-olefin polymers may be prepared in a simple manner.

The present invention relates, accordingly, primarily, to catalytic solids based on titanium trichloride complex obtained by heat treatment, in the presence of a halogenated activating agent, of the liquid material resulting from bringing TiCl₄, pretreated with an electron-donor compound, into contact with a composition (C) corresponding to the general formula

$$AlR_p(Y)_qX_{3-(p+q)} \quad (I)$$

in which

R represents a hydrocarbon radical;
Y represents a group chosen from —OR', —SR' and —NR'R", in which R' and R" each represent a hydrocarbon radical or a hydrogen atom;
X represents a halogen; p is an arbitrary number such that $0<p<3$; and q is an arbitrary number such that $0<q<3$, the sum (p+q) being such that $0<(p+q)\leq 3$.

In the formula (I) of the composition (C), R, R' and R" are, in the case where they represent a hydrocarbon radical, generally each chosen, independently of one another, from:

straight-chain or branched alkyl radicals containing from 1 to 12 carbon atoms, for example the methyl, ethyl, n-propyl, isopropyl, n-butyl, isobutyl, n-amyl, isoamyl, n-hexyl, 2-ethylhexyl and n-octyl radicals;
alkenyl radicals containing from 2 to 12 carbon atoms, for example the ethenyl, 1-butenyl, 2-butenyl, 2-penten-4-yl, 1-octenyl and 1-decenyl radicals;
optionally substituted cycloalkyl radicals containing from 5 to 12 carbon atoms, for example the cyclopentyl, cyclohexyl, methylcyclohexyl and cyclooctyl radicals;
optionally substituted aryl radicals containing from 6 to 35 carbon atoms, for example the phenyl, tolyl, cresyl, xylyl, naphthyl and 2,6-di-tert-butyl-4-methylphenyl radicals; and
arylalkyl radicals containing from 7 to 20 carbon atoms, for example the benzyl radical.

In the formula (I), X is preferably chlorine; R is preferably chosen from the straight-chain or branched alkyl radicals containing from 2 to 8 carbon atoms; Y is preferably chosen from the groups —OR' in which R' is an alkyl radical as defined above or an aryl radical as defined above. A very particularly preferred radical R is the ethyl radical. Very particularly preferred radicals R' are ethyl and isoamyl radicals.

In the formula (I), p is preferably a number such that $1\leq p\leq 2$ and q is preferably a number such that $0.1\leq q\leq 2$ and very particularly such that $0.15\leq q\leq 0.65$.

The compositions (C) used to prepare the catalytic solids according to the invention may be chemically defined compounds or mixtures of compounds. The formula (I) must therefore be regarded as an empirical structural formula representing the said compounds or, in the case of mixtures, representing the average composition of the latter.

The compositions (C) used to prepare the catalytic solids according to the invention may be prepared from organoaluminium compounds (A) of general formula

$$AlR_nX_{3-n} \quad (II)$$

in which R and X have, respectively, the meanings given above with respect to formula (I) and in which n is an arbitrary number such that $0<n\leq 3$, preferably such that $1\leq n\leq 3$.

The following may be mentioned as examples of compounds (A): alkylated aluminium compounds, such as trialkylaluminiums, dialkylaluminium monohalides and alkylaluminium dihalides and sesquihalides, in which the alkyl radicals are those defined and enumerated above.

Preferred compounds (A) are dialkylaluminium chlorides, very particularly diethylaluminium chloride.

For the preparation of the composition (C), the compound (A) may be brought into contact with a compound (B) chosen from the compounds of general formula:

$$AlR_m (Y)_{m'} X_{3-(m+m')} \quad (III)$$

$$YH \quad (IV)$$

and from the oligomers of aluminoxane type which are in cyclic and/or linear form and may be represented by the general formulae $$-[Al(R)-O]-_{n'+2} \quad (V)$$

and $$R_2Al-O-[Al(R)-O]_{n'}-AlR_2 \quad (VI)$$

In the above formulae (III), (V) and (VI), R, Y and X have, respectively, the meanings given above with respect to formula (I). In formula (III), m is an arbitrary number such that $0\leq m<3$, preferably such that $0.5\leq m\leq 1.5$; m' is an arbitrary number such that $0<m'\leq 3$, preferably such that $1\leq m'\leq 2$; the sum (m+m') being such that $0<(m+m')\leq 3$.

In the formulae (V) and (VI), n' is an integer, generally between 2 and 50.

Examples which may be mentioned of compounds (B) of formula (III) are: trialkoxyaluminiums, alkoxyalkylaluminiums, alkoxyaluminium halides and alkylalkoxyaluminium halides. Preferred compounds (B) of formula (III) are alkylalkoxyaluminiums and their chlorides, very particularly diethylethoxyaluminium and ethylethoxy- and ethylisopentoxyaluminium monochlorides. Examples which may be mentioned of compounds (B) of formula (IV) are: alcohols, thioalcohols, phenols, thiophenols and secondary amines. Preferred compounds of formula (IV) are aliphatic alcohols, for example methanol, ethanol, propanol, isopropanol, butanol, isobutanol, pentanol, 2-methyl-1-pentanol (isoamyl alcohol), hexanol, 2-ethylhexanol and octanol. Very particularly preferred alcohols are ethanol and isoamyl alcohol.

Examples which may be mentioned of compounds (B) of formula (V) and (VI) are: methyl-, ethyl- and butylaluminoxanes.

The compound (A) and the compound (B) defined above are brought into contact in the proportions appropriate for obtaining a composition (C) corresponding to the above formula (I). In order to do this, account must be taken of the respective natures of the compounds (A) and (B) used, as well as any chemical reactions which may take place during their mixing.

The precise determination of the amounts of compounds (A) and (B) to be used may, accordingly, necessitate a few preliminary routine tests.

A particularly preferred and simple operating method for the preparation of the composition (C) comprises bringing a compound (A) which is an alkylated aluminium compound into contact with a compound (B) which is an aliphatic alcohol, in a ratio between the aluminium contained in the compound (A) and the hydrocarbon radical contained in the compound (B) of between 1/0.1 and 1/3. This bringing into contact induces an at least partial chemical reaction between these compounds, giving rise, in particular, to the formation of an $=Al-OR'$ bond and being accompanied by an evolution of gas.

The other general conditions for the preparation of the composition (C) are not critical.

In general, the reaction is carried out in liquid phase, for example by mixing together the compound (A) and the compound (B) at least one of these frequently being liquid under normal temperature and pressure conditions. It is also possible to carry out the reaction in the presence of an inert hydrocarbon diluent, generally chosen from liquid aliphatic, cycloaliphatic and aromatic hydrocarbons, such as the liquid alkanes and isoalkanes and benzene. In this case, the composition (C) is generally present in this diluent in a proportion of 1 to 50% by volume, preferably of 5 to 30% by volume.

The compounds (A) and (B) may be brought into contact at temperatures of between about 0° and 90° C., preferably between 20° and 50° C. approximately and their mixture kept for a time sufficient to allow any possible chemical reaction between them to take place completely, generally for between 5 minutes and 48 hours, preferably between 2 and 24 hours.

For the preparation of the catalytic solids according to the invention, the composition (C) is brought into contact with $TiCl_4$, which is itself pretreated with an electron-donor compound. This electron-donor compound is generally chosen from organic compounds comprising one or more atoms or groups having one or more free electron pairs capable of ensuring coordination with titanium. These compounds have from 1 to 30 carbon atoms per electron donor atom or group.

The following may be mentioned amongst the atoms capable of giving one or more electron pairs: atoms of non-metals of groups V and VI of the Periodic Table, such as, for example, oxygen, sulphur, nitrogen, phosphorus, antimony and arsenic.

The following may be mentioned as representative examples of compounds containing groups capable of giving one or more electron pairs: ethers, thioethers, thiols, phosphines, stibines, arsines, amines, amides, ketones and esters.

Preferably, the electron-donor compound is chosen from the group comprising aliphatic ethers, and more particularly from those in which the aliphatic radicals contain from 2 to 8 carbon atoms, preferably 4 to 6 carbon atoms. A typical example of an aliphatic ether giving very good results is diisoamyl ether.

The general conditions for the treatment of $TiCl_4$ with the electron-donor compound are not critical, provided that they give rise to complexation of the $TiCl_4$ by the electron-donor compound. In general, the reaction is carried out in liquid phase, by adding the electron-donor compound, optionally dissolved in an inert hydrocarbon diluent as defined above, to the $TiCl_4$, which is itself in pure liquid form or dissolved in such a diluent. When use is made of a diluent, the $TiCl_4$ is generally present therein in a proportion of 1 to 50% by volume, preferably of 5 to 30% by volume. The treatment of $TiCl_4$ with the electron-donor compound is carried out at a temperature which is generally between 0° C. and the boiling point of $TiCl_4$ or of the diluent, if such is used, preferably between 5° and 40° C.

The molar ratio between $TiCl_4$ and the electron-donor compound may vary within wide limits. It is generally between 0.01 mol and 20 mol of $TiCl_4$ per mole of electron-donor compound, preferably between 0.2 and 10 mol per mole. The best results have been obtained for molar ratios between $TiCl_4$ and the electron-donor compound of between 0.3 and 5.

The general conditions for bringing $TiCl_4$ pretreated with the electron-donor compound as described above (hereinafter abbreviated to "pretreated $TiCl_4$") into contact with the composition (C) are also not critical, provided that they lead to the formation of a liquid material which is substantially homogeneous and free from solid. In general, the composition (C), in pure liquid form or in dilute form in an inert hydrocarbon diluent as defined above, is introduced into the pretreated $TiCl_4$, which is itself in liquid form or diluted in an inert hydrocarbon diluent which may be identical to or different from that in which the composition (C) has optionally been diluted.

The composition (C) and the pretreated $TiCl_4$ are brought into contact in respective amounts such that an at least partial reaction of the $TiCl_4$ is produced without substantial concomitant production of solid precipitate. To this end, the amount of composition (C) brought into contact with the pretreated $TiCl_4$ is such that the atomic ratio between the aluminium contained in the composition (C) and the titanium contained in the pretreated $TiCl_4$ is generally between 0.05 and 10, preferably between 0.1 and 8; the best results are obtained if this ratio is between 0.2 and 2.

The temperature at which the composition (C) and the pretreated $TiCl_4$ are brought into contact is generally between 0° and 60° C., preferably between 10° and 40° C.

For the preparation of the catalytic solids according to the invention, the liquid material obtained as indicated above must be converted into solid particles. To this end, the said material undergoes a heat treatment in the presence of a halogenated activating agent.

The general conditions for the heat treatment of the liquid material are not critical provided that this treatment induces substantial precipitation of particles of solid based on titanium trichloride. These conditions are generally also chosen so as to lead to substantially spherical particles which are of uniform particle size and have an average diameter of between 5 and 150 microns ($\mu$m), preferably between 10 and 100 $\mu$m.

To this end, the liquid material is brought progressively from a temperature higher than the temperature at which the composition (C) is brought into contact with the pretreated $TiCl_4$ to a temperature which does not exceed the boiling point of the liquid material.

In general, the temperatures between which the liquid material is heated range from about 20° to about 150° C., preferably from about 40° to about 130° C. and very particularly from 80° to 120° C. approximately.

The duration of the heat treatment is generally between 5 and 150 minutes, preferably between 20 and 120 minutes and very particularly between 30 and 75 minutes.

The heat treatment may be carried out by raising the temperature of the liquid material in a continuous manner or by observing one or more plateaus during the rise in temperature.

Further details relating to the heat treatment of liquid materials, related to those defined above, may be found in particular in the U.S. Pat. No. 4,115,533 (MITSUBISHI CHEMICAL INDUSTRIES), the contents of which are incorporated by reference in the present description.

According to the invention, the heat treatment of the liquid material takes place in the presence of a halogenated activating agent. "Halogenated activating agent" is understood to denote all of the agents whose presence contributes to the conversion of the reduced solid titanium trichloride which forms during the heat treatment of the liquid material substantially into the stereospecific violet form of this solid.

These agents are generally chosen from inorganic halogenated compounds, organic halogenated compounds, hydrocarbylaluminium halides, interhalogen compounds and halogens. Amongst these agents, the following may be mentioned:

by way of inorganic halogenated compounds: metal and non-metal halides, such as titanium, vanadium, zirconium, aluminium, silicon and boron halides, for example;

by way of organic halogenated compounds: halogenated hydrocarbons, such as halogenated alkanes and carbon tetrahalides, for example;

by way of hydrocarbylaluminium halides: alkylaluminium dihalides in which the alkyl radical contains from 1 to 8 carbon atoms;

by way of interhalogen compounds: iodine chloride and iodine bromide, for example; and by way of halogen: chlorine, bromine and iodine.

Examples of activating agents which are very suitable are titanium tetrachloride, silicon tetrachloride, iodobutane, monochloroethane, hexachloroethane, chloromethylbenzene, carbon tetrachloride, ethylaluminium dichloride, iodine chloride and iodine. The best results have been obtained with titanium tetrachloride ($TiCl_4$).

The activating agent may be added to the liquid material at any time during the heat treatment; it may, for example, be added at the start of the heat treatment; it may also, in particular when plateaus are observed during the rise in temperature, be added throughout the heat treatment, in particular during one of these plateaus.

When use is made of $TiCl_4$ as activating agent, this $TiCl_4$ may advantageously originate from a non-reduced excess of the initial $TiCl_4$ from which the catalytic solids according to the invention are prepared.

The amount of activating agent used is expressed relative to the amount of titanium trichloride present in the liquid material. It is generally between 0.1 and 20 mol of activating agent per mole of titanium trichloride, preferably between 0.5 and 10 mol per mole. The best results have been obtained when the activating agent is used in a proportion of 1 to 5 mol per mole of titanium trichloride.

It has proved advantageous to subject the particles of solid based on titanium trichloride complex resulting from the heat treatment of the liquid material described above to ageing, generally carried out at the temperature reached at the end of the heat treatment, for a period of generally between 15 minutes and 24 hours, preferably between 30 minutes and 5 hours.

The particles of solid based on titanium trichloride complex obtained by the process described above are preferably separated from their preparation medium, for example by filtration, settling or centrifuging. They are preferably then washed using an inert hydrocarbon diluent of the same nature as those optionally used to prepare the catalytic solid.

As has been mentioned above, if the operating conditions for the heat treatment of the liquid material have been adjusted to this end, these solid particles have a generally substantially spherical shape, a narrow particle size distribution and an average diameter of preferably between 10 and 100 $\mu m$. Their titanium trichloride content is generally higher than 50% by weight, preferably higher than 75% by weight, and their electron-donor compound content is generally less than 15% by weight, preferably less than 10% by weight, relative to the total weight of the particles.

A considerable advantage of the invention lies in the fact that the porosity of the particles of catalytic solid may be controlled to a large extent by the choice of certain operating conditions for their preparation. It has thus been found, in particular, that, all other conditions remaining substantially unaltered, an increase in the content of Y groups in the composition (C) leads to a modification of the porosity of the particles of catalytic solid and in particular to an increase in the internal porosity of these particles generated by pores whose radius is between 1000 and 15000 Å (hereinafter termed more simply IPV). By virtue of the process for the production of catalytic solids according to the invention, it is therefore possible to adjust their porosity, in particular the IPV, from values as low as 0.02 $cm^3/g$ approximately up to values as high as 0.4 $cm^3/g$ approximately.

It is also found that, all other conditions remaining substantially unaltered, an increase in the amount of composition (C) used leads, with a higher yield, to the production of particles of catalytic solid which are of smaller size and have a smaller pore volume.

The increase in the porosity of the catalysts within the zone of pore radii under consideration leads in particular to alpha-olefin polymers of increasing porosity, which enables the incorporation therein of large and increasing amounts of elastomeric products without encountering adhesion problems.

Diverse variants may be applied to the processes, described above, for the preparation of the catalytic solids based on titanium trichloride complex according to the invention without departing from the scope of the latter.

A first embodiment variant (a) consists in adding an organic or inorganic support (S), having a porous texture such that the particles of solid based on titanium trichloride complex are deposited on the surface of the support (S) or precipitate inside the pores of the latter, to the mixture for the preparation of the catalytic solid based on $TiCl_3$ complex, at any time but preferably before the heat treatment of the liquid material. This addition may, for example, be carried out before bringing the pretreated $TiCl_4$ into contact with the composition (C).

In order to do this, supports (S) are generally used in which the pore volume is at least 0.1 $cm^3/g$ and preferably at least 0.2 $cm^3/g$. This pore volume generally does not exceed 3.5 $cm^3/g$, preferably does not exceed 2.5 $cm^3/g$ and more particularly does not exceed 2.2 $cm^3/g$. Good results are obtained when the specific surface area of the supports (S) is larger than 1 $m^2/g$. Most often, the specific surface area of these supports is less than 900 $m^2/g$.

The supports (S) generally consist of particles larger than 5 $\mu m$ in size and more particularly larger than 10 $\mu m$ in size. In general, the size of the particles of the supports (S) is not larger than 350 $\mu m$ and preferably not larger than 200 $\mu m$.

Organic supports (S) which can be used are, for example, preformed polymers such as styrene polymers and copolymers, vinyl chloride polymers and copolymers, acrylic acid ester polymers and copolymers, polymers and copolymers of olefins containing from 2 to 18 carbon atoms, etc. Polymers which are also suitable for this use are polyacrylonitriles, polyvinylpyridine and polyvinylpyrrolidine.

Inorganic supports (S) which can be used are, for example, solids well known as catalytic supports, such as the silicon, aluminium, magnesium, titanium and zirconium oxides and their mixtures. Amongst these inorganic supports (S), the solids based on alumina and silica and their mixtures are preferentially used.

The supports (S) used in this variant of the process according to the invention must generally be inert towards the reagents used in the synthesis of the catalytic solids based on titanium trichloride complex described above. In order to do this, it may be preferable to subject them, before their use, to a heat treatment intended to remove all traces of residual moisture therefrom.

The catalytic solids thus obtained have an appearance identical to that of the supports used. Their porosity depends on the conditions for their preparation and on the nature of the support (S) introduced into the preparation mixture.

The titanium trichloride content of the catalytic solids obtained according to this variant of the process according to the invention is generally between about 7% and about 60% and the electron-donor compound content is most often between about 1 and about 10% by weight relative to the total weight of the catalytic solid.

This variant of the process for the preparation of the catalytic solids according to the invention constitutes another means of controlling their porosity.

A second embodiment variant (b) consists in "prepolymerising" the particles of catalytic solid based on titanium trichloride complex; this "prepolymerisation" treatment consists in bringing these particles into contact with a lower alpha-monoolefin, such as ethylene, or, preferably, propylene, under polymerising conditions so as to obtain a solid containing in general between 5 and 500% by weight approximately of "prepolymerised" alpha-monoolefin. This "prepolymerisation" may advantageously take place on the particles resulting from the heat treatment of the liquid material in an optional inert hydrocarbon diluent as defined above, for a period sufficient to obtain the desired amount of prepolymerised alpha-monoolefin on the solid.

A third embodiment variant (c) consists in subjecting the particles of catalytic solid based on titanium trichloride complex to a supplementary activating treatment with the aim of maintaining the stability of its properties and/or with the aim of increasing its stereospecificity. This supplementary activating treatment consists in bringing the particles of catalytic solid, preferably separated from the mixture in which they have been prepared, into contact with a supplementary activating agent chosen from organoaluminium compounds and the products of the reaction of an organoaluminium compound with a compound chosen from hydroxyaromatic compounds in which the hydroxyl group is sterically blocked. The organoaluminium compound is preferably chosen from trialkylaluminiums and alkylaluminium chlorides. The hydroxyaromatic compound is preferably chosen from di-tert-alkylated monocyclic monophenols and monoesters of 3-(3',5'-di-tert-butyl-4'-hydroxyphenyl)propionic acid, for example n-octadecyl 3-(3',5'-di-tert-butyl-4'-hydroxyphenyl)propionate.

It is also possible to combine the variants (b) and (c) described above, that is to say to subject the particles of catalytic solid simultaneously to the supplementary activating treatment and the "prepolymerisation" treatment described above.

Further details with regard to the supplementary activating treatment defined above, in particular with regard to the nature of the organoaluminium and hydroxy-aromatic compounds, with the operating conditions under which this treatment is carried out, will be found in the patents BE-A-803875 (SOLVAY & Cie) and FR-A-2604439 (SOLVAY & Cie), the contents of which are incorporated by reference in the present description.

For the polymerisation, the catalytic solid according to the invention is used together with an activator chosen from the organometallic compounds of metals of groups Ia, IIa, IIb and IIIb of the Periodic Table (version published in Kirk-Othmer Encyclopedia of Chemical Technology, 2nd completely revised edition, volume 8, 1965, page 94) and preferably from the compounds of formula:

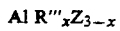

$$Al\ R'''_x Z_{3-x}$$

where
R''' is a hydrocarbon radical containing from 1 to 18 carbon atoms and preferably from 1 to 12 carbon atoms, chosen from alkyl, aryl, arylalkyl, alkylaryl and cycloalkyl radicals; the best results are obtained when R''' is chosen from alkyl radicals containing from 2 to 6 carbon atoms;
Z is a halogen chosen from fluorine, chlorine, bromine and iodine; the best results are obtained when Z is chlorine; and
x is any number such that $0 < x \leq 3$ and preferably such that $1.5 \leq x \leq 2.5$; the best results are obtained when x is 2.

Diethylaluminium chloride (DEAC) ensures a maximum activity and maximum stereospecificity of the catalytic system.

It is also possible to introduce a third constituent conventionally known to improve the stereospecificity of the catalytic system into the polymerisation mixture, between the catalytic solid and the activator defined above.

This third constituent may be chosen, for example, from ethers, esters, amides and organosilanes.

The catalytic systems thus defined apply to the polymerisation of olefins which have terminal unsaturation and the molecule of which contains from 2 to 18 and preferably from 2 to 6 carbon atoms, such as ethylene, propylene, 1-butene, 1-pentene, methyl-1-butenes, hexene, 3- and 4-methyl-1-pentenes and vinylcyclohexene. They are particularly valuable for the stereospecific polymerisation of propylene, 1-butene and 4-methyl-1-pent-1-ene to form crystalline polymers which are strongly or weakly isotactic. They also apply to the copolymerisation of these alpha-olefins with comonomers chosen from these non-identical alpha-olefins and/or diolefins containing from 4 to 18 carbon atoms. Preferably, the diolefins are non-conjugated aliphatic diolefins, such as 1,4-hexadiene, non-conjugated monocyclic diolefins, such as 4-vinylcyclohexene, alicyclic diolefins having an endocyclic bridge, such as dicyclopentadiene, methylenenorbornene and ethylidenenorbornene, and conjugated aliphatic diolefins, such as butadiene or isoprene.

One advantage of the catalytic systems according to the invention is that, if their porosity is sufficiently high, they permit the incorporation of a larger fraction of comonomers.

They also apply to the production of copolymers termed block copolymers which are made up from alpha-olefins and/or diolefins. These block copolymers consist of distinct blocks of variable compositions; each block consists of an alpha-olefin homopolymer or of a statistical copolymer comprising an alpha-olefin and at least one comonomer chosen from alpha-olefins and diolefins. The alpha-olefins and the diolefins are chosen from those mentioned above.

The catalytic solids according to the invention are suitable for the production of propylene homopolymers and of copolymers containing in total at least 50% by weight of propylene and preferably 60% by weight of propylene. They are particularly suitable for the production of block copolymers consisting of blocks of crystalline propylene homopolymer or statistical copolymer containing at least 90% of propylene and blocks of statistical copolymer containing from 40 to 70 mol-% of propylene and from 60 to 30 mol-% of ethylene and relatively rich (more than 10% by weight and up to 70% by weight relative to the total weight of the block copolymer) in these latter blocks.

The polymerisation may be carried out by any known process: in solution or in suspension in an inert hydrocarbon solvent or diluent, such as those defined with respect to the preparation of the catalytic solid and which is preferably chosen from butane, pentane, hexane, heptane, cyclohexane, methylcyclohexane or their mixtures. It is also possible to carry out the polymerisation in the monomer or one of the monomers kept in the liquid state or, alternatively, in the gas phase.

The use of the more porous catalytic solids according to the invention is highly advantageous for the production of block copolymers rich in blocks of propylene and ethylene statistical copolymer defined above, especially in the gas phase polymerisation processes.

The catalytic systems according to the invention, in fact, allow large amounts of statistical copolymer to be incorporated in the propylene homopolymer.

Now, this statistical copolymer is generally an amorphous and sticky product which, if it is present in the free state and in a large amount, causes blocking and clogging of the polymerisation reactors and mainly does so in the gas phase processes. The use of the catalytic systems according to the invention is therefore particularly advantageous in these processes.

The polymerisation temperature is chosen generally between 20° and 200° C. and preferably between 50° and 90° C., the best results being obtained between 65° and 85° C. The pressure is chosen generally between atmospheric pressure and 50 atmospheres and preferably between 10 and 30 atmospheres. This pressure of course depends on the temperature used.

The polymerisation may be carried out continuously or discontinuously.

The preparation of the copolymers termed block copolymers may also be carried out by known processes. It is preferred to use a two-step process consisting in polymerising an alpha-olefin, generally propylene, by the method described above for homopolymerisation. Subsequently, the other alpha-olefin and/or diolefin, generally ethylene, is polymerised on the same catalytic site. This second polymerisation may be carried out after having completely or partially removed the monomer which has not reacted during the first step.

The organometallic compound and the catalytic solid may be added separately to the polymerisation mixture. It is also possible to bring them into contact at a temperature between −40° and 80° C. for a period which is dependent on this temperature and which may range from one hour to several days, before introducing them into the polymerisation reactor.

The total amount of organometallic compound used is not critical; it is generally more than 0.1 mmol per liter of diluent, of liquid monomer or of reactor volume, preferably more than 0.5 mmol per liter.

The amount of catalytic solid used is determined as a function of its $TiCl_3$ content. It is generally chosen such that the concentration of the polymerisation mixture is higher than 0.01 mmol of $TiCl_3$ per liter of diluent, of liquid monomer or of reactor volume, and preferably higher than 0.05 mmol per liter.

The ratio of the amounts of organometallic compound and of catalytic solid is also not critical. It is generally chosen such that the molar ratio of organometallic compound/$TiCl_3$ present in the solid is between 0.5 and 20 and preferably between 1 and 15. The best results are obtained when the molar ratio is between 2 and 12.

The molecular weight of the polymers produced by the process of the invention may be controlled by the addition of one or more molecular weight-controlling agents, such as hydrogen, diethylzinc, alcohols, ethers and alkyl halides, to the polymerisation mixture.

The following examples serve to illustrate the invention.

The meaning of the symbols used in these examples, the units expressing the quantities mentioned and the methods for determination of these quantities are explained below.

IPV = internal pore volume of the catalytic solid recorded in the zone of pore radii between 1000 and 15000 Å and expressed in $cm^3/g$.

$D_m$ = average diameter of the catalytic solid particles in μm.

FPV = total pore volume of the solid polymer collected, expressed in $cm^3/g$.

SPV = total pore volume of the support (S), expressed in $cm^3/g$.

Ss = specific surface area of the catalytic solid, expressed in $m^2/g$ (British standard BS 4359/1).

Ssu = specific surface area of the support (S), expressed in $m^2/g$ (British standard BS 4359/1).

α = catalytic activity conventionally expressed as grams of polymer insoluble in the polymerisation mixture, obtained per hour and per gram of $TiCl_3$ contained in the catalytic solid. This activity is assessed indirectly from the determination of the residual titanium content in the polymer by X-ray fluorescence.

ASW = apparent specific weight of the insoluble polymer fraction, expressed in $g/dm^3$.

fTri = isotacticity index of the polymer, determined from the molar fraction of isotactic triads (block chain of three propylene monomer units in meso configuration) in the total polymer. This value is determined by $^{13}C$ nuclear magnetic resonance as described in Macromolecules, volume 6, No. 6, page 925 (1973) and in references (3) to (9) of this publication.

MFI = melt flow index determined under a load of 2.16 kg at 230° C. and expressed in g/10 min (ASTM standard D 1238).

G = torsional rigidity modulus of the polymer, determined at 100° C. and for a torsion angle of 60° arc, the temperature of the mould being fixed at 70° C. and the conditioning time at 5 minutes (standards BS 2782 - Part I - method 150A; ISO 458/1, method B; DIN 53447 and ASTM D 1043). This modulus is expressed in $daN/cm^2$.

Et = ethyl radical $C_2H_5$.

Isoamyl = isoamyl radical $(CH_3)_2CH-CH_2-CH_2-$

The average diameter of the catalytic solid particles is estimated by observation of this solid as a suspension in decalin under an optical microscope (magnification 200).

The porosity of the catalysts and that of the polymers obtained in the polymerisation tests described below are determined by the mercury penetration method using porosimeters marketed by Carlo Erba Co. in the zone of pore radii between 75 and 75000 Å.

The ethylene content of the block copolymers is obtained from the characteristic signals of these units observed by $^{13}C$ nuclear magnetic resonance as described in Rubber Chemistry and Technology, volume 44 (1971), page 781 et seq.

EXAMPLES 1 TO 3

A—Preparation of the Catalytic Solids

1—Preparation of the compositions (C)

80 ml of a dry mixture of aliphatic hydrocarbons boiling at 175° C. (marketed under the name Isopar H by EXXON CHEMICALS) and 17 ml (136 mmol) of diethylaluminium chloride (DEAC) are introduced, under a nitrogen atmosphere, into a 200-ml reactor fitted with a single-blade stirrer rotating at 400 rev/min.

While keeping the temperature of this solution below 50° C., a chosen amount of isoamyl alcohol, as indicated in Table I below, is added dropwise thereto. Stirring of the solution is continued for 20 hours at ambient temperature before the solution is used.

The compositions (C) may be represented by the empirical formula $AlEt_p(Oisoamyl)_qCl$, for which the values of the numbers p and q, corresponding to the molar ratios between the various constituents, are indicated in Table I.

2—Synthesis of the catalytic solids 100 ml of Isopar H and 15 ml of $TiCl_4$ are introduced into a 1-1 autoclave fitted with a single-blade stirrer rotating at 250 rev/min and previously purged with nitrogen.

Keeping this solution at 30° C., 69 ml (340 mmol) of diisoamyl ether (DIAE) are added thereto in the course of 30 minutes. Following this addition, 97 ml of a composition (C) as described in Table I, which is equivalent to 136 mmol of aluminium, are introduced into the "pretreated" TiCl₄ within half an hour. Finally, 45 ml of TiCl₄ are added in the course of about 10 minutes, while increasing the temperature so as to attain 100° C. after 1 hour. The first solid particles appear during this heat treatment.

The reaction mixture, consisting of a suspension of particles, is kept at this temperature for 2 hours (ageing) and then brought back to ambient temperature.

The liquid phase is then separated off from the catalytic solid by decanting and the solid product (about 45 g) is washed with hexane by successive decanting and then dried for 2 hours under a stream of nitrogen at 70° C.

The characteristics of these catalytic solids, which are purplish-blue in colour, are also given in Table I below.

The solid particles are in the form of spheroid agglomerates of finer grains arranged in groups.

B—Polymerisation of Propylene in Suspension in the Liquid Monomer in the Presence of the Catalytic Solids (Reference Conditions)

The following are introduced into a previously dried 5-1 autoclave, while sweeping with dry nitrogen:
400 mg of DEAC (in the form of a 200 g/l solution in hexane) marketed by SCHERING, the Cl/Al atomic ratio of which is adjusted to 1.02 by the addition of ethylaluminium dichloride;
50 mg of catalytic solid (the molar ratio between the DEAC and the TiCl₃ present in the solid is then about 10);
hydrogen under a partial pressure of about 1 bar; and
3 l of liquid propylene.

The reactor is kept at 65° C., with stirring, for 3 hours. The excess propylene is then degassed and the polypropylene (PP) formed, which is in the form of grains of uniform morphology, is recovered.

The results obtained during the polymerisation experiments with the various catalytic solids are also given in Table I below.

TABLE I

|  | Examples | | |
| --- | --- | --- | --- |
|  | 1 | 2 | 3 |
| Preparation of the compositions (C) | | | |
| Volume of alcohol (ml) | 3.75 | 7.5 | 9 |
| Empirical formula AlEt$_p$ (Oisoamyl)$_q$Cl | | | |
| p | 1.75 | 1.5 | 1.4 |
| q | 0.25 | 0.5 | 0.6 |
| Characterisation of the catalytic solids | | | |
| TiCl₃ content (g/kg) | 805 | 773 | 770 |
| Aluminium content (g/kg) | 1 | 1.2 | 1.3 |
| DIAE content (g/kg) | 95 | 78 | 62 |
| IPV | 0.043 | 0.06 | 0.08 |
| Ss | 172 | 174 | 90 |
| D$_m$ | 15–20 | 10–20 | 15–25 |
| Polymerisation results | | | |
| Activity α | 4810 | 3835 | 2200 |
| ASW | 366 | 378 | 318 |
| fTri | 91.8 | 91 | 93 |
| G | 605 | 515 | — |
| MFI | 17.2 | 2.9 | 25.1 |
| FPV | 0.06 | 0.1 | 0.17 |

It is thus found that, all other things being equivalent, variable contents of groups Y in the composition (C) enable the internal porosity of the catalytic solids to be controlled to a large extent. More particularly, an increase in the intermediate pore volume for the pore radii between 1000 and 15000 Å (IPV) in parallel with the increase in the group Y content is observed.

EXAMPLES 4R AND 5R

These examples 4R and 5R are given by way of comparison.

EXAMPLE 4R 100 ml of Isopar H and 15 ml (136 mmol) of TiCl₄ are introduced successively, with stirring (single-blade stirrer rotating at 250 rev/min), into a 1-1 dry autoclave kept at 30° C. under a nitrogen atmosphere. 69 ml (340 mmol) of diisoamyl ether are then added in the course of 30 minutes. Following this addition, a solution consisting of 80 ml of Isopar H and 17 ml of DEAC is introduced dropwise in the course of half an hour. Finally, while progressively (in the course of 1 hour) raising the temperature of the solution up to 100° C., 45 ml (408 mmol) of TiCl₄ are added in the course of 10 minutes. The reaction mixture is kept at this temperature for 2 hours and then brought back to ambient temperature, washed with hexane and dried using dry nitrogen and heat. This solid contains, per kg: 635 g of TiCl₃, 12 g of aluminium and 10 g of DIAE; its IPV is 0.29 cm³/g and its Ss is 140 m²/g.

A polymerisation experiment is carried out in the presence of this catalytic solid under conditions strictly identical to those described in Example 1, part B. At the end of this experiment, 115 grams of polymer (α=1280) are recovered, this polymer being in the form of grains of irregular morphology and having an ASW of only 205 g/dm³.

EXAMPLE 5R

A catalytic solid based on TiCl₃ is prepared as described in Example 1 but using the composition (C) described below.

The composition (C) is obtained by mixing 80 ml of Isopar H, 8.5 ml (68 mmol) of DEAC and 22.75 ml (136 mmol) of dibutyl ether (DBUE).

The catalytic solid contains 799 g/kg of TiCl₃, 1.3 g of aluminium and 86 g of DIAE; its IPV is 0.26 cm³/g.

The polymerisation experiment (conditions: Example 1, part B) permits the production, with an activity α of only 1190, of a polymer for which the isotacticity index determined by NMR is only 86%.

EXAMPLES 6 AND 7

Catalytic solids are prepared as in Example 1 except in respect of the addition of TiCl₄.

In Example 6, the heat treatment of the liquid material resulting from the contact between the "pretreated" TiCl₄ and the solution (C) takes place after the addition of all of the TiCl₄.

In Example 7, all of the TiCl₄, that is to say 60 ml, is introduced as a single amount from the start of the synthesis of the catalytic solid.

The characteristics of these solids and the results of the polymerisation experiments are collated in Table II below.

TABLE II

|  | Examples | |
| --- | --- | --- |
|  | 6 | 7 |
| Properties of the catalytic solids | | |
| TiCl₃ content (g/kg) | 860 | 776 |

TABLE II-continued

| | Examples | |
|---|---|---|
| | 6 | 7 |
| Aluminium content (g/kg) | 0.8 | 1.2 |
| DIAE content (g/kg) | 85 | 71 |
| IPV | 0.06 | 0.06 |
| Ss | 159 | 176 |
| Polymerisation results | | |
| Activity α | 3835 | 3700 |
| ASW | 376 | 375 |
| fTri | 90 | 92 |
| G | 540 | 625 |
| MFI | 4.2 | 10.4 |
| FPV | 0.11 | 0.09 |

EXAMPLE 8

The catalytic solid is prepared using the method described in Examples 1 to 3, part A, paragraph 2, using the composition (C) obtained as described below.

80 ml of Isopar H and 18.5 ml of triethylaluminium (TEAL) are introduced successively into a 200-ml reactor previously purged with dry nitrogen. While keeping this solution at a temperature below 50° C., 22.5 ml of isoamyl alcohol are added dropwise. The empirical formula of this composition is: $AlEt_{1.5}Oisoamyl_{1.5}$.

The catalytic solid contains 764 g/kg of $TiCl_3$, 1 g of aluminium and 71 g of DIAE; its IPV is 0.09 cm$^3$/g and its specific surface area is 51 cm$^2$/g.

Used in the test for the polymerisation of propylene in a condensed medium, it leads, with an activity α of 2835, to a polypropylene having an ASW of 362, an MFI of 7.6, a G of 535 and an isotacticity index determined by NMR of 88%. The FPV of the solid polymer is 0.09.

EXAMPLE 9

This example illustrates a variant of the synthesis of the composition (C).

80 ml of Isopar H, 102 mmol (12.7 ml) of DEAC and 34 mmol of chloroethoxyethylaluminium are introduced successively, under a nitrogen atmosphere, into a previously dried reactor in order to obtain a composition of empirical formula $AlEt_{1.75}OEt_{0.25}Cl$.

This solution is added to the "pretreated" $TiCl_4$ solution as described in Examples 1 to 3, part A, paragraph 2, in order to form a purplish-blue catalytic solid containing 792 g of $TiCl_3$, 0.8 g of aluminium and 63 g of DIAE per kg of solid and having a IPV and Ss of, respectively, 0.061 cm$^3$/g and 165 m$^2$/g.

The $D_m$ of the catalyst grains is between 15 and 20 μm.

The polymerisation test (reference conditions) allows the production of 350 g of polymer (activity α of 3230) having the following characteristics:
ASW=340 g/dm$^3$
fTri=94.8%
G=700 daN/cm$^2$
MFI=3 g/10 min
FPV=0.12 cm$^3$/g

EXAMPLE 10

A composition (C) of empirical formula $AlEt_{1.65}(OEt)_{0.35}Cl$ is obtained by reacting 17 ml of DEAC with 3 ml of ethanol using the method described for Example 1.

The production of the catalytic solid, identical to that described in Example 1, leads to a violet solid containing, per kg, 879 g of $TiCl_3$, 0.9 g of aluminium and 127 g of DIAE.

The IPV is 0.067 cm$^3$/g.

Used in the propylene polymerisation test, under the reference conditions, this catalytic solid leads to the production, with an activity α of 4060, of a polymer which has an ASW of 358 and an FPV of 0.1 cm$^3$/g. The other characteristics of the polypropylene are: fTri=92%; MFI=3.8 and G=546.

EXAMPLE 11

A—Preparation of the Catalytic Solid

1—Preparation of the composition (C)

800 ml of Isopar H and 170 ml of DEAC are introduced successively, under a nitrogen atmosphere, into a 2-l reactor fitted with a single-blade stirrer rotating at 400 rev/min. Subsequently 82 ml of isoamyl alcohol are introduced dropwise (in the course of one hour) while keeping the temperature of the solution below 50° C.

The solution is stored at ambient temperature, with stirring and while sweeping with nitrogen, for 16 hours before it is used.

This composition may be characterised by the empirical formula: $AlEt_{1.45}(Oisoamyl)_{0.55}Cl$.

2—Synthesis of the catalytic solid 1 l of Isopar H and 150 ml of $TiCl_4$ are introduced into a 5-l dry reactor fitted with a single-blade stirrer rotating at 220 rev/min. Keeping this $TiCl_4$ solution at 30° C., 690 ml of DIAE are introduced slowly (30 minutes), followed by 970 ml of the composition (C) described above. The introduction of the composition (C) is carried out in the course of 60 minutes. After having reduced the stirring speed to 85 rev/min, 450 ml of $TiCl_4$ are introduced in the course of 20 minutes, while raising the temperature in order to attain 100° C. after 50 minutes. The suspension is kept at 100° C. for 2 hours and the solid formed is isolated by settling and then washed 7 times with 2 l of dry hexane.

This catalytic solid, of purplish-blue colour, contains, per kg, 830 g of $TiCl_3$, 1 g of aluminium and 58 g of DIAE. Its IPV is 0.07.

3—Prepolymerisation of the catalytic solid

All of the catalytic solid obtained according to point 2 (that is to say about 317 g of solid based on $TiCl_3$ complex) is suspended in 1.8 l of hexane at 30° C., while stirring at 150 rev/min.

780 ml of a hexane solution of a preactivating agent (hereinafter termed preactivating agent D), previously prepared by mixing, per liter of hexane, 80 g of DEAC and 176 g of n-octadecyl 3-(3',5'-di-tert-butyl-4'-hydroxyphenyl)propionate marketed under the name IRGANOX 1076 by CIBA-GEIGY, are introduced slowly (30 minutes). This solution is used 15 minutes after the end of the evolution of gas observed during its preparation.

Following this addition, 240 ml of propylene are introduced in the course of 30 minutes and stirring of the suspension is continued for a further 30 minutes.

After settling, the resulting prepolymerised catalytic solid is washed 7 times using 2 l of dry hexane, the solid being resuspended after each washing, and then dried by sweeping with nitrogen in a fluidised bed for 2 hours at 70° C.

The preactivated catalytic solid contains, per kg, 533 g of $TiCl_3$, 8.2 g of aluminium, 18 g of DIAE, 228 g of polypropylene and an amount of preactivating agent D estimated at 142 g. The IPV of the catalyst is 0.09 cm$^3$/g and its specific surface area is 8 m$^2$/g.

B—Polymerisation of Propylene in the Gaseous Monomer

The preactivated catalytic solid is used in an experiment for the polymerisation of propylene comprising a first step carried out in the liquid monomer and a second step carried out in the gas phase under the operating conditions detailed below.

The following are introduced, under a stream of nitrogen, into a 5-1 autoclave used according to Example 1, part B:

342 mg of an activating agent consisting of a mixture of DEAC as used above with triethylaluminium and ethyl benzoate (EB). The molar ratios of DEAC/EB and TEAL/EB are, respectively, 60/1 and 2.2/1.

35 mg of prepolymerised catalytic solid (the molar ratio between the DEAC and the TiCl$_3$ present in the solid is then about 15).

An absolute pressure of 2 bars of hydrogen is then produced in the autoclave, 1 l of liquid propylene is then introduced, with stirring, and the temperature is raised to 50° C. Polymerisation is carried out under these conditions for 10 minutes. The autoclave is then degassed to a pressure of 7 bars absolute, while being heated to 75° C. An absolute hydrogen pressure of 0.8 bar is then produced therein and propylene is then introduced in the gas state until a total pressure of 21 bars absolute at the temperature under consideration is reached. After polymerisation under these conditions for 4 hours, the reaction is stopped by the introduction of 25 ml of a 1 mol/l sodium hydroxide solution and, after washing the polymer with 2 l of water, 214 g of dry polymer are recovered.

The activity of the catalytic solid is then 1820 and the productivity is 7280 g of polypropylene (PP) per gram of preactivated catalytic solid. This PP has an MFI of 14.8, a fTri of 97 and an FPV of 0.15 cm$^3$/g.

EXAMPLE 12

The prepolymerised catalytic solid described in Example 11 is used in a two-step polymerisation experiment which has the aim of producing a block copolymer by the method described below.

The following are introduced, under a stream of nitrogen, into a 5-1 autoclave used according to Example 1, part B:

342 mg of an activating agent consisting of a mixture of DEAC as used above with triethylaluminium and ethyl benzoate (EB). The molar ratios of DEAC/EB and TEAL/EB are, respectively, 60/1 and 2.2/1.

35 mg of preactivated catalytic solid (the molar ratio between the DEAC and the TiCl$_3$ present in the solid is then about 15).

An absolute pressure of 2 bars of hydrogen is then produced in the autoclave, 1 l of liquid propylene is then introduced, with stirring, and the temperature is raised to 50° C. Polymerisation is carried out under these conditions for 10 minutes. The autoclave is then degassed to a pressure of 7 bars absolute, while being heated to 75° C. An absolute hydrogen pressure of 0.6 bar is then produced therein and propylene is then introduced in the gas state until a total pressure of 21 bars absolute at the temperature under consideration is reached. After polymerisation for 2 hours, the autoclave is degassed to 4.5 bars absolute while keeping the temperature at 75° C. In a first step, gaseous propylene is introduced therein so as to ensure a total pressure in the autoclave of 15.4 bars at the temperature under consideration and gaseous ethylene is then introduced to obtain a total pressure of 21 bars absolute. The propylene is copolymerised with the ethylene for 140 minutes while continuously feeding the autoclave with a gaseous mixture of propylene and ethylene having the composition of the copolymer formed, so as to keep the composition of the polymerisation mixture constant.

The polymerisation is stopped by the introduction of 25 ml of a 1 mol/l sodium hydroxide solution and, with an activity α of 1433, 360 g of polymer are recovered, which polymer has a good pourability and the following characteristics:

MFI=0.61
G=185
FPV=0.04

The proportion of elastomer in the total polymer is 59% by weight; the ethylene content of the total polymer is 265 g/kg.

EXAMPLE 13

This example illustrates a variant of the synthesis of the composition (C).

The catalytic solid is prepared as in Example 1 but by replacing the 7.5 ml of isoamyl alcohol by 8.5 ml of 3-methylbutane-1-thiol.

The characterisation of the catalytic solid and that of the polypropylene obtained in a reference experiment are described in Table III below.

TABLE III

| Properties of the catalytic solids | |
|---|---|
| TiCl$_3$ content (g/kg) | 847 |
| Aluminium content (g/kg) | 0.7 |
| DIAE content (g/kg) | 90 |
| IPV | 0.095 |
| Ss | 90 |
| Polymerisation results | |
| Activity α | 1970 |
| ASW | 310 |
| fTri | 92 |
| MFI | 6.1 |
| FPV | 0.07 |

EXAMPLES 14 TO 17

These examples illustrate the preparation of catalytic solids in the presence of an organic or inorganic support (S).

A—Preparation of the Catalytic Solids

1—Preparation of the compositions (C)

30 ml of Isopar H and 5.7 ml of DEAC are introduced into a 100-ml flask previously conditioned under nitrogen. While continuing to stir this solution at 40° C., 1.2 ml of isoamyl alcohol are added dropwise thereto in the course of about 30 minutes. Stirring of the solution thus obtained is continued for 12 hours before it is used.

2—Synthesis of the catalytic solids

The nature and the amount of the supports (S) used in these syntheses, their characteristics and the heat treatments to which they were subjected beforehand are given in Table IV below.

160 ml of Isopar H, 23 ml of diisoamyl ether and the chosen amount (as indicated in Table IV) of support (S) are introduced successively into a 1-liter autoclave fitted with a single blade stirrer rotating at 250 rev/min and previously purged with nitrogen. 20 ml of TiCl$_4$ are then added to this suspension in the course of 30 minutes.

While keeping this suspension at 30° C., 35.7 ml of the composition (C) described above are added thereto within 1 hour. The temperature is then raised so as to attain 100° C. after 1 h.

The reaction mixture is kept at this temperature for 2 hours and then brought back to ambient temperature.

The liquid phase is then separated from the catalytic solid by decanting and the solid product is washed with hexane by successive decanting and then dried for 1 hour under a stream of nitrogen at 70° C.

The catalytic solid thus obtained has an appearance identical to that of the support; its colour is violet. Table IV below also gives the characteristics of the catalytic solids obtained as well as their performance in the polymerisation test in the liquid monomer under the reference conditions (Example 1, part B).

TABLE IV

| | Examples | | | |
|---|---|---|---|---|
| | 14 | 15 | 16 | 17 |
| Characteristics of the supports (S) | | | | |
| type | silica | silica | alumina | polymer* |
| trade name | SG 532 | SAEHS 33-50 | KETJEN 13 | CHROMO-SORB 101 |
| company | GRACE | CARBOR-UNDUM | AKZO | Jhons-Manville Co Ltd |
| SPV | 0.6 | 0.33 | 1 | 0.9 |
| Ssu | 320 | 3 | 301 | 41 |
| Heat treatment of the support (S) | | | | |
| Temperature (°C.) | 800 | 800 | 800 | 80 |
| time (h) | 16 | 16 | 16 | 1 |
| Amount of support (S) used (g) | 25 | 90 | 25 | 25 |
| Characteristics of the catalytic solids | | | | |
| TiCl$_3$ content (g/kg) | 363 | 134 | 350 | 118 |
| DIAE content (g/kg) | 89 | 16 | 50 | 46 |
| IPV | 0.01 | 0.10 | 0.12 | 0.05 |
| Ss | 243 | 33 | 204 | — |
| Dm | 20–200 | 10–150 | — | — |
| Polymerisation results | | | | |
| Activity α | 2800 | 3980 | 3450 | 3340 |
| ASW | 395 | 359 | 442 | 330 |
| fTri | 89 | 90 | 90 | 91 |
| G | 445 | 500 | 575 | — |
| MFI | 2.9 | 4.1 | 6.1 | 4 |
| FPV | 0.08 | 0.30 | 0.12 | 0.14 |

*comprising a styrene/divinylbenzene copolymer

We claim:

1. A catalytic solid for the stereospecific polymerisation of alpha-olefins, obtained by heat treatment, in the presence of a halogenated activating agent, of a liquid material prepared by contacting TiCl$_4$, pretreated with an electron-donor compound, with a composition (C) of the formula $$AlR_p(Y)_q X_{3-(p+q)} \quad (I)$$

in which

R represents a hydrocarbon radical;
Y represents a group chosen from —OR', —SR' and —NR'R", in which R' and R" each represent a hydrocarbon radical or a hydrocarbon atom;
X represents a halogen;
p is an arbitrary number such that 0<p<3; and
q is an arbitrary number such that 0<p<3; the sum (p+q) being such that 0<(p+q)≦3
to precipitate a catalytic solid comprising a titanium trichloride complex.

2. The catalytic solid according to claim 1, wherein in formula (I):
R represents a straight-chain or branched alkyl radical containing from 2 to 8 carbon atoms;
Y represents a group —OR', in which R' is chosen from straight-chain or branched alkyl radicals containing from 1 to 12 carbon atoms and aryl radicals containing from 6 to 35 carbon atoms;
X represents chlorine;
p is a number such that 1≦p≦2; and
q is a number such that 0.1≦q≦3.

3. The catalytic solid according to claim 1, wherein the electron-donor compound is chosen from aliphatic ethers.

4. The catalytic solid according to claim 1, wherein the halogenated activating agent is chosen from inorganic halogenated compounds.

5. The catalytic solid according to claim 4, wherein the halogenated activating agent is TiCl$_4$.

6. The catalytic solid according to claim 1, including adding an organic or inorganic support (S) at any time to the mixture for the preparation of the said solid.

7. The catalytic solid according to claim 6, wherein the support (S) is added before the heat treatment of the liquid material.

8. The catalytic solid according to claim 6, wherein the support (S) is a preformed organic polymer.

9. The catalytic solid according to claim 6, wherein the support (S) is an oxygen-containing compound.

10. A process for the preparation of a catalytic solid for the stereospecific polymerisation of alpha-olefins, comprising subjecting a liquid material prepared by contacting TiCl$_4$, pretreated with an electron-donor compound, with a composition (C) corresponding to the general formula $$AlR_p(Y)_q X_{3-(p+q)} \quad (I)$$

in which

R represents a hydrocarbon radical;
Y represents a group chosen from —OR', —SR' and —NR'R", in which R' and R" each represent a hydrocarbon radical or a hydrogen atom;
X represents a halogen;
p is an arbitrary number such that 0<p<3; and
q is an arbitrary number such that 0<q<3; the sum (p+q) being such that 0<(p+q)≦3, to a heat treatment carried out in the presence of a halogenated activating agent to precipitate a catalytic solid comprising a titanium trichloride complex.

11. The process according to claim 10, wherein the amount of composition (C) brought into contact with the pretreated TiCl$_4$ is such that the atomic ratio between the aluminium contained in the composition (C) and the titanium contained in the pretreated TiCl$_4$ is between 0.1 and 8.

12. The process according to claim 10, wherein the heat treatment is carried out under conditions inducing the substantial precipitation of solid particles comprising titanium trichloride.

13. The process according to claim 10, wherein the halogenated activating agent is added at the start of the heat treatment.

14. The process according to claim 10, wherein the halogenated activating agent is $TiCl_4$ originating from a non-reduced excess of the initial $TiCl_4$.

15. The process according to claim 10, wherein the amount of activating agent used is between 0.5 and 10 mol per mole of titanium trichloride present in the liquid material.

16. The process according to claim 10, wherein the heat treatment is followed by ageing.

17. The process according to claim 10, wherein an organic or inorganic support (S) is added at any time to the mixture for the preparation of the said solid.

18. The catalytic solid according to claim 9 wherein said oxygen-containing compound is selected from the group consisting of oxides of silicon, aluminum, magnesium, titanium, and zirconium, and mixtures thereof.

* * * * *